Figure 1:
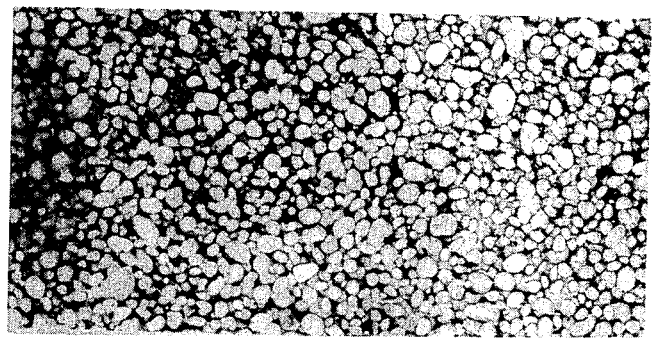

Sept. 13, 1966    N. S. MARCUS ET AL    3,272,683
METHOD OF MAKING A PEBBLED FLOOR COVERING AND PRODUCT
Filed March 21, 1963    2 Sheets-Sheet 1

INVENTORS
NATALIE S. MARCUS
ERNEST R. HOLMSTROM
MERRILL M. SMITH
BY
ATTORNEYS

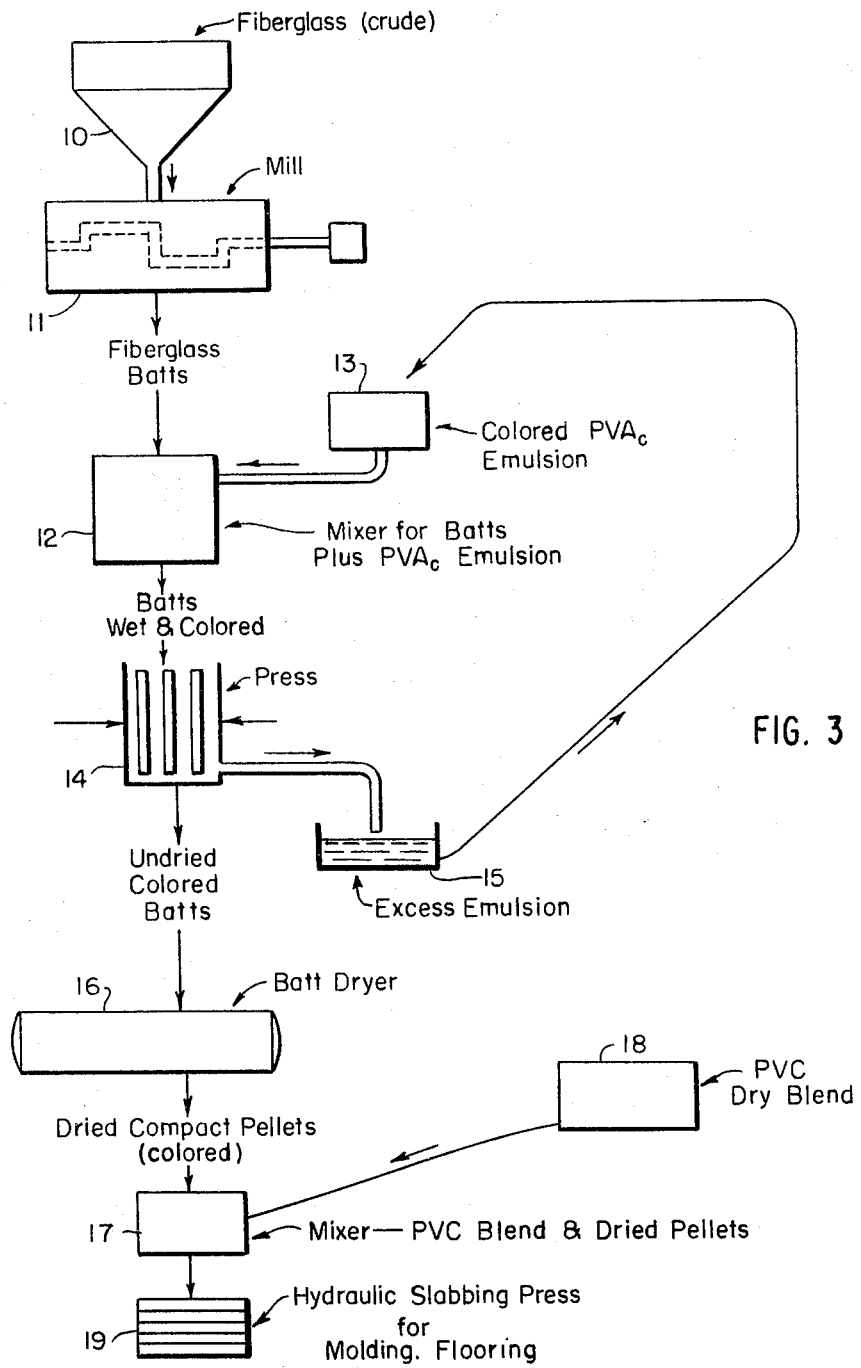

United States Patent Office 3,272,683
Patented Sept. 13, 1966

3,272,683
METHOD OF MAKING A PEBBLED FLOOR
COVERING AND PRODUCT
Natalie S. Marcus, Trenton, N.J., and Ernest R. Holmstrom and Merrill M. Smith, Morrisville, Pa., assignors to American Biltrite Rubber Co., Inc., Chelsea, Mass., a corporation of Delaware
Filed Mar. 21, 1963, Ser. No. 267,044
8 Claims. (Cl. 161—5)

This invention comprises new and improved floor covering of distinctive and ornamental appearance as well as the capacity for long life in use. Elastomeric floorings have been produced heretofore and are now available in designs which simulate practically every type of wood in different grains and colors, stone or marble of different colors and textures, and the terrazzo types which have been made in the past from crushed particles of natural rocks. In addition, printed effects with surface color ornamentation or color designs protected by a transparent wear film have been successfully developed with varying degrees of transparency to produce cloud-like effects and illusion of depth.

In view of the wide-spread development of attractive and useful floorings of elastomeric composition the present inventors have focused their attention on the development of floorings having an outstanding and attractive feature of coloring and texture which distinguish them from the more conventional types. The object of the present invention is to produce a flooring of novel appearance and structure which will satisfy these requirements.

We have discovered that by properly incorporating small compact pellets of glass fibers in a translucent matrix of polyvinyl resin we have been able to achieve an elastomeric flooring of unique appearance and surface contour resembling a random distribution of small colored pebbles beneath a transparent wear layer that creates the impression of standing water above the pellets.

The granular or pebble component of our novel flooring is prepared from filaments of glass fiber by milling or grinding under mixing conditions so that the product may be collected in the form of small fluffy batts or wads. While these are not coherent they tend somewhat to mat together in bulk. They are, of course, non-combustible and also resilient and generally white in color.

The batts are now converted into hard colored pellets by the following steps. They are first mixed with a water emulsion of pigment and polyvinyl acetate or the like. An open can type mixer with a mechanical stirrer is suitable for this operation. Preferably, an excess of emulsion is used, being then filtered off or expressed and returned for reuse. In a drying and tumbling operation the batts are then compacted into hard rounded discrete pellets coated with polyvinyl chloride which forms the matrix in which they are to be subsequently embedded. The pellets pick up temporarily considerable moisture from the polyvinyl acetate emulsion and when dried the ratio of polyvinyl acetate to glass fiber is about 1 to 1, the pellets being impregnated and coated as units. The polyvinyl acetate emulsion consists of a stable suspension of plasticized vinyl elastomer in water to which the coloring agent has been added.

The dried colored pellets are next mixed with a dry powdered blend of plasticized vinyl elastomer capable of being molded and of forming a colorless or translucent matrix. This mixing step may be carried out with the assistance of any commercially available mixer or blender. A suitable mixture comprises 20–70% pellets to 80–30% dry elastomer blend.

Once the pellets are thoroughly mixed in the dry blend they are loaded directly into a suitable mold and pressed at a molding temperature from 300–360° F. and under pressure of 400–800 p.s.i. in either a flat press or a press of the rotary type.

The product is molded between parallel relatively smooth molding surfaces, but when the molding pressure is released the pellets tend to resume their globular form creating nodules in the low relief in the surface of the resulting flooring.

Figure 2:
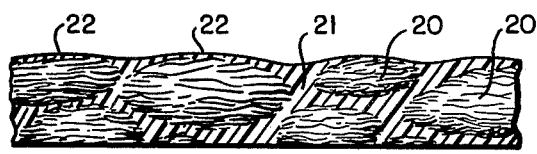

These and other features of the invention will be best understood and appreciated from the following description of a preferred embodiment thereof, selected for purposes of illustration and shown in the accompanying drawing, together with a flow sheet indicating the process of its manufacture, in which:

FIG. 1 is a fragmentary plan view of the product,
FIG. 2 is a sectional view on an enlarged scale, and
FIG. 3 is the flow sheet.

In carrying out the manufacturing process as indicated by the flow sheets of FIG. 3, the glass fiber strands or filaments are delivered in bulk to a hopper 10 from which they pass downwardly to a mill 11 where they are milled and mixed until converted into a mass of small fluffy batts or wads as before stated.

The dry loose batts are advanced from the mill 11 to a mixer 12 where they are immersed and thoroughly stirred in a colored polyvinyl acetate emulsion which is delivered to the mixer at a constant level from a reservoir 13.

The saturated and now dyed batts are next fed from the mixer 12 to a press 14 in which all excess emulsion is filtered and expressed from the batts and collected in a tank 15. From the tank 15 the emulsion is pumped back to the reservoir 13 through by-pass piping. The colored batts at this stage retain 10 to 40% moisture content as a result of the press action.

The dyed batts are now transferred from the press 14 to a drier 16 where they are tumbled, dried and compacted into hard discrete pellets or pebbles. The drier may take the form of a screen wire drum through which hot air is circulated. The transformation of the soft dyed batts into hard discrete pellets takes place by the tumbling at this stage of the process, the pellets now having a ratio of polyvinyl acetate to glass fiber of about 1 to 1.

The pellets are now advanced from the drier 16 and then to a mixer 17 where they are mixed with a dry blend of powdered vinyl chloride elastomer with a plasticizer and other conventional constituents. A typical and satisfactory composition is as follows.

| Item: | Weight, lbs. |
|---|---|
| Polyvinyl chloride | 100 |
| Di-octyl phthalate | 30 |
| Plasticizer | 5 |
| Barium-cadmium laurate | 2 |
| Dry blend total weight | 137 |

This dry blend may be supplied from a magazine 18 from which it is delivered at a measured rate to the mixer. As above stated, the mixture may contain 20–70% of pellets and 80–30% dry blend. In place of polyvinyl chloride we may employ any resin having similar properties, such as polyvinyl acetate or butyrate, or polyethylene. In place of the di-octyl phthalate component any other suitable vinyl plasticizer may be employed.

Once the pellets are thoroughly mixed into the dry blend the mixture is loaded directly into the mold 19 which is labeled "Hydraulic Slabbing Press" in FIG. 3. Here the mixture remains for about five minutes under pressure and heat at a temperature of 300–350° F. or until the mixture is thoroughly fluxed and molded into a transparent matrix in which the pellets are embedded under compression. In this step a continuous, wear-resisting surface layer of the matrix compound is formed above the pellets which are now distributed in distinct granular contact as shown in FIG. 1.

Molding pressure in the heated product is released while the matrix is still somewhat viscous and under such conditions the compressed pellets tend to expand, causing plastic flow in the matrix and the formation of the desired rounded low relief nodules in the exposed surface of the molded sheet as suggested in FIG. 2.

The general appearance of the final product as shown in FIG. 1 is that of a heterogeneous mass of colored pebbles distributed at different levels beneath a transparent layer that resembles clear standing water. In the enlarged sectional view of FIG. 2 the pebbles are shown as expanded pellets 20 embedded in a colorless transparent matrix 21 with the pellets near the upper surface lying beneath the surface nodules 22. The lower surface of the sheet as herein shown has been brought into a single plane by grinding or sanding sufficiently to smooth the nodules.

The hard dried pellets of glass and polyvinyl chloride have a specific gravity in bulk of about 0.215 and their transformation from the soft batts in the drying operation is a very striking phenomenon.

Having thus disclosed our invention and described in detail an illustrative embodiment thereof, we claim as new and desire to secure by Letters Patent:

1. An elastomeric flooring of pebbled appearance and surface contour, comprising a translucent matrix of polyvinyl resin containing a random distribution of small compact pellets of glass fibers distributed in visible contact and completely enclosed within said matrix.

2. An elastomeric flooring comprising a translucent matrix of polyvinyl resin containing a multiplicity of compact colored pellets of glass fibers disposed in visible contact beneath an unbroken outer layer of the matrix and underlying nodules in the exposed surface of the covering product.

3. An elastomeric floor covering, comprising a transparent matrix of vinyl plastic compound, and a heterogeneous distribution of colored pellets of glass fibers having a pebble appearance arranged at different levels beneath a surface wear layer of the matrix compound which has surface nodules above those pellets located adjacent to the surface layer of the matrix.

4. The process of making elastomeric flooring of pebbled surface contour, comprising the steps of mixing discrete pellets of milled glass fibers with a dry blend of translucent polyvinyl resin and plasticizer, subjecting the mixture to pressure and heat between flat surfaces thereby fluxing the components of the said dry blend and forming it as a matrix about the glass fibers units, and then permitting the glass fibers units to expand and form nodules in relief in the surface of the flooring thus produced.

5. The process of making elastomeric flooring of pebbled appearance and surface contour, comprising the steps of, (1) mixing discrete pellets of milled glass fibers with a dry blend of translucent polyvinyl resin and plasticizer, (2) fluxing the components of said dry blend and forming it as a matrix about the glass fibers units by subjecting the mixture to heat and pressure between flat molding surfaces, and (3) permitting the glass fibers units to expand by releasing the molding pressure on the fluxed mixture, and thereby to form nodules in relief in the surface of the flooring thus produced.

6. The process of making elastomeric flooring of pebbled appearance and surface contour, comprising the steps of:
compacting loose batts of fluffy glass fibers into discrete colored pellets,
mixing the colored pellets with a dry blend of powdered translucent polyvinyl resin and plasticizer,
fluxing the mixture by heating between flat surfaces,
removing pressure while the matrix remains warm and flexible thus permitting expansion of said pellets, and
hardening by cooling the flooring thus produced.

7. The process of making elastomeric flooring of pebbled appearance, comprising the steps of mixing discrete pellets of glass fibers coated with polyvinyl chloride and having a specific gravity in bulk of about 0.215, with a dry blend of plasticized polyvinyl chloride in a ratio of 20–70% of pellets to 80–30% dry blend, fluxing the mixture between hot molding surfaces, and releasing pressure while the product remains viscous.

8. An elastomeric floor covering comprising a translucent matrix of polyvinyl resin containing a random distribution of compact rounded pellets of plasticized polyvinyl resin combined with glass fibers in visible contact substantially within a wear-resisting surface layer of the matrix.

References Cited by the Examiner
UNITED STATES PATENTS

| 2,644,780 | 7/1953 | Simkins et al. | 156—210 XR |
| 2,987,102 | 6/1961 | Henriche | 161—5 |
| 3,194,859 | 7/1965 | Wacker | 161—5 XR |

ALEXANDER WYMAN, *Primary Examiner.*
JACOB H. STEINBERG, *Examiner.*

UNITED STATES PATENT OFFICE
CERTIFICATE OF CORRECTION

Patent No. 3,272,683　　　　　　　　　　　　September 13, 1966

Natalie S. Marcus et al.

It is hereby certified that error appears in the above numbered patent requiring correction and that the said Letters Patent should read as corrected below.

Column 4, lines 31 and 32, for "chloride" read -- acetate --.

Signed and sealed this 5th day of September 1967.

(SEAL)
Attest:

ERNEST W. SWIDER
Attesting Officer

EDWARD J. BRENNER
Commissioner of Patents